Aug. 21, 1962  M. W. JOHNSTON ETAL  3,050,081

FLUID PRESSURE CONTROL VALVE

Filed Dec. 31, 1958  2 Sheets-Sheet 1

INVENTORS
R. D. MARKLE JR.
M. W. JOHNSTON
BY
ATT'Y.

Aug. 21, 1962   M. W. JOHNSTON ETAL   3,050,081
FLUID PRESSURE CONTROL VALVE
Filed Dec. 31, 1958   2 Sheets-Sheet 2

INVENTORS
R. D. MARKLE JR.
M. W. JOHNSTON
BY *Edgar H. Kent*
ATT'Y.

United States Patent Office 3,050,081
Patented Aug. 21, 1962

3,050,081
FLUID PRESSURE CONTROL VALVE
Mason W. Johnston and Ralph D. Markle, Jr., Red Hook,
N.Y., assignors to International Business Machines Corporation, New York, N.Y., a corporation of New York
Filed Dec. 31, 1958, Ser. No. 784,369
3 Claims. (Cl. 137—622.5)

This invention relates to control mechanisms and more particularly to a novel fluid control valve, especially appropriate for association with electrical data translation equipment.

The accurate and reliable translation of data by electrical pulses necessitates the minimizing or avoidance of all possible sources of interference. Where solenoid control valves must be used in conjunction with data translation equipment such valves must be carefully designed because the solenoid energization signals may produce electrical interference with data signals translated over adjacent electrical circuits. The control valve associated with the large pneumatically controlled pluggable unit of the type disclosed in Patent No. 2,975,390, for example, presents a particular problem. The valve should be compact and reliable in operation. Additionally, it should be simple in construction and have a minimum number of easily fabricated working parts so that it may be manufactured economically. Of prime significance, electrical actuating means associated with the valve must be deenergized whenever the associated circuits are completed and preferably at all times except during actual switching operations, in order to avoid cross-talk interference with the proper operation of the electrical data translation. Conventional control valves are inadequate in one or more of the above-mentioned respects.

Accordingly, it is an object of this invention to provide a control valve mechanism which is simple and reliable in operation and which is controlled so that its electrical actuators are deenergized at all times except during transitional instants.

Another object of the present invention is to provide an improved three-position control valve mechanism.

Other objects of the invention will be seen as the detailed description of the preferred embodiment progresses, in conjunction with the drawings, in which.

The valve structure according to the invention comprises two valve members, each of which controls the flow of fluid to and from an associated control port. The valve members are interconnected by a mechanism which allows relative movement between them so that a three-position valve structure is provided with two independently actuated valve members. One valve member has a single position of dwell and the second has two such positions. A mechanical interconnection is provided so that actuation of the first valve member will move the second valve member if that member is in the first of its two dwell positions but will not disturb it when it is in the second dwell position. The valve actuators are deenergized at all times except when it is desired to move the associated valve member from a dwell position.

In the preferred embodiment the two valve members are housed in a single cylinder in axial alignment with one another and the mechanical interconnection means is disposed between them. A common supply port and a control port associated with each valve member are provided in the cylinder wall and the ends of the cylinder are utilized as discharge ports. The actuators associated with valve members are electrically operated solenoids. Mechanical means are provided for positioning the valve members in their dwell positions. The valve member having two dwell positions thus is positioned in one of those positions except during transitional instants while the valve member with the single dwell position has associated with it spring biasing means which is adapted to return it to its dwell position upon deenergization of its actuator. The mechanical interconnection is a T and slotted hook mechanism which provides a lost motion connection between the two valve members. This valve structure is a compact, reliable unit which provides the required fluid flow control functions and the valve actuators are deenergized during electrical data translation operations, thus avoiding cross-talk problems. It is realized, that while this valve structure has particular advantages in the specific pluggable unit application, it may find advantageous use in other applications.

The following detailed description of the valve according to a preferred embodiment of the invention may be understood with reference to the drawings.

Figure 1:
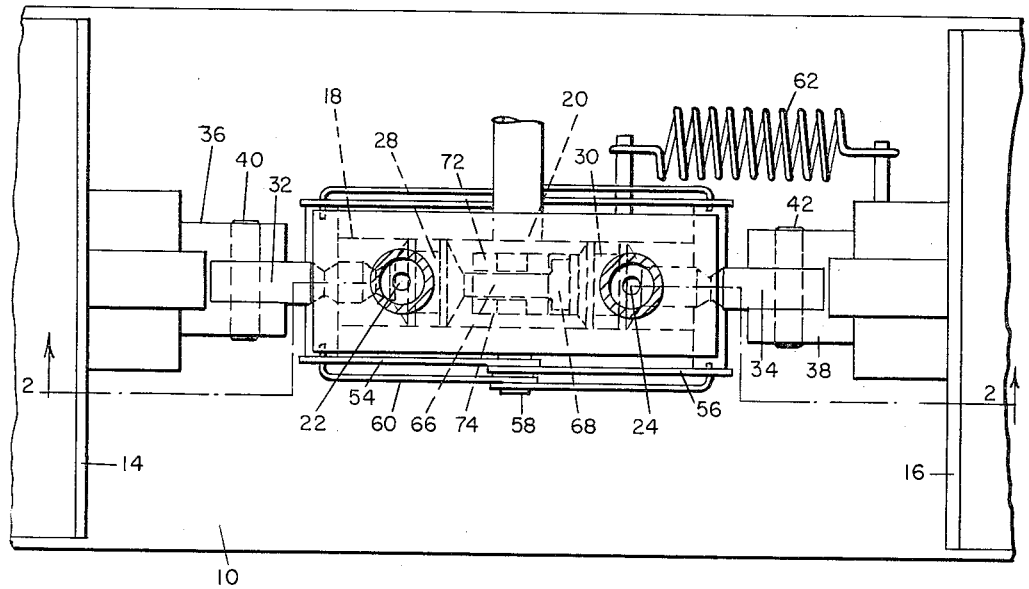
FIG. 1 is a top view of the control valve according to the preferred embodiment of the invention.

As shown in FIG. 1, this valve is adapted to be mounted on a base 10 and includes a valve casing 12 and two solenoid actuators shown generally at 14 and 16. The valve casing includes a cylindrical bore 18 having a supply port 20 and two control ports 22 and 24 which pass through its walls. Conventional piping is associated with each port.

Positioned within the cylinder 18 are two valve members, each having a head portion 28, 30 respectively and a stem portion 32, 34 respectively. The stem portion of each valve member is connected to the associated armature 36, 38 respectively of the solenoids by pins 40 and 42. Two V-shaped grooves 44 and 46 are formed in valve stem 32 and serve as detent receiving portions. A single similar groove 48 is formed in valve stem 34. Disposed below each valve stem is a pin 50, 52 respectively, carried by arms 54 and 56 which are pivoted together at pin 58 and biased upwardly by spring 60 so that the pins are urged into engagement with the V-shaped detent receiving portions of stems 32, 34.

Figure 2:
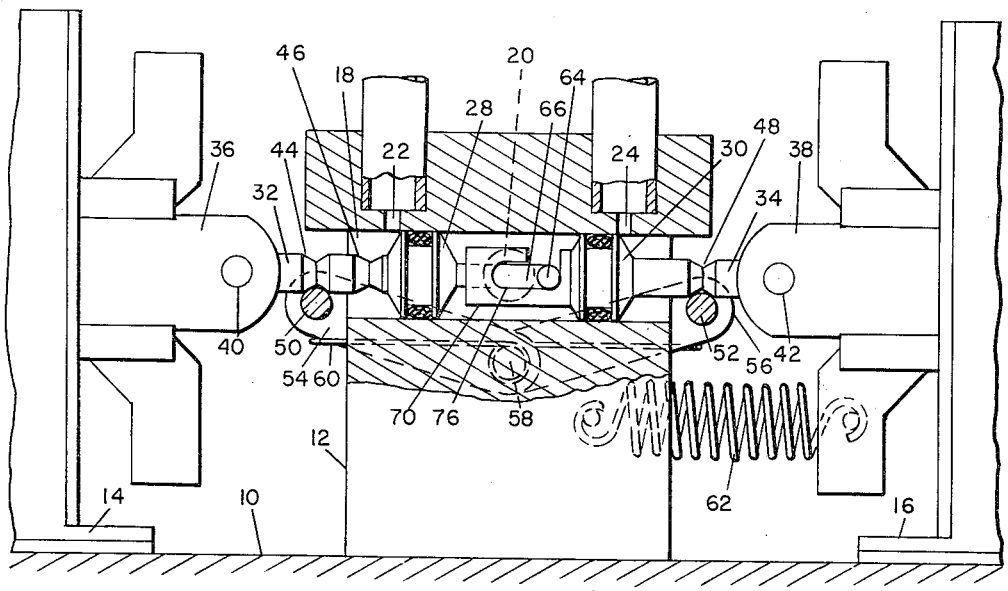
FIG. 2 is a side view, partly in section, of the control valve, taken along the lines 2—2 of FIG. 1.

A spring 62, connected between the armature 38 and the valve casing 12 is arranged to bias the valve member 30 to the left as shown in FIG. 2. This spring acts in opposition to the force of the solenoid 16 when energized and returns the armature to the left upon deenergization of the solenoid.

The two valve heads 28 and 30 are connected together in a manner which allows limited relative movement between the two heads. In the preferred embodiment a T-shaped extension 64 consisting of a longitudinal member 66 and a lateral member 68 is secured to the valve head 28, and is received into and cooperates with the slotted member 70 secured to the valve head 30. The member 70 has walls 72, 74 which define a channel in which the longitudinal part 66 of the T 64 slides. Similar slot portions 76 are cut in each of the walls and receive the lateral part 68 so that the T is permitted a certain limited longitudinal movement relative to the slotted member. This connection permits operation of solenoid 16 to move valve head 30 without affecting valve head 28 when it is in the position shown in FIG. 2 but causes movement of valve head 28 when it is in the position shown in FIG. 3.

A cycle of valve operation is as follows. With the valve elements in a position as shown in FIG. 2 both control ports 22 and 24 are in communication with discharge ports. The valve members are secured in place by the detents 50 and 52 cooperating with the grooves 44 and 48 respectively. In this position either valve head may be energized and moved independently of the other. If solenoid 16 is energized the valve member 30 will move to the right connecting the control port 24 to the supply port 20 (but upon deenergization of the solenoid it will be immediately returned to the position of FIG. 2 due to the biasing force of the spring 62).

Figure 3:
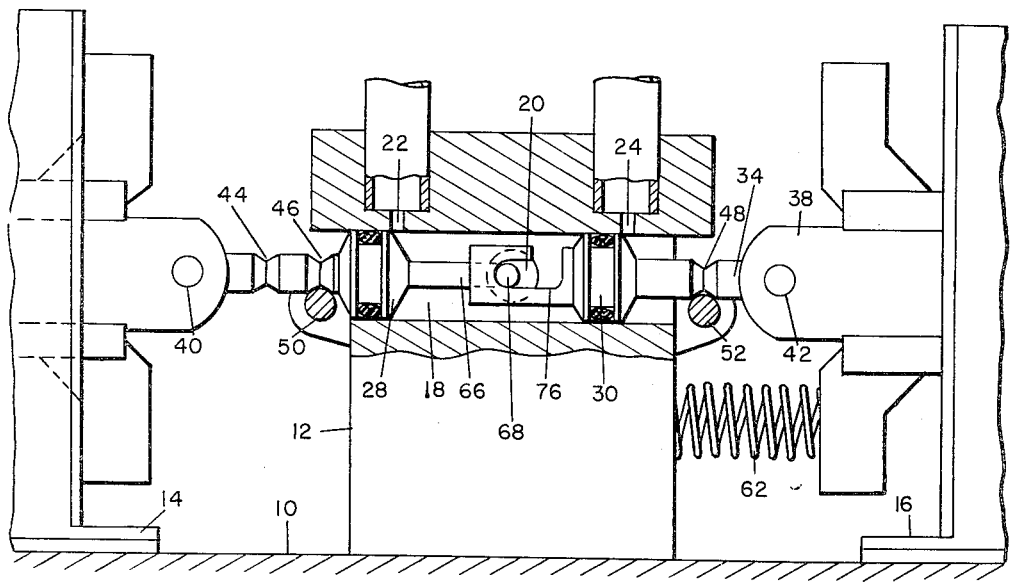
FIGS. 3 and 4 are side views corresponding to FIG. 2 illustrating the movements of certain of the valve elements.
Figure 4:
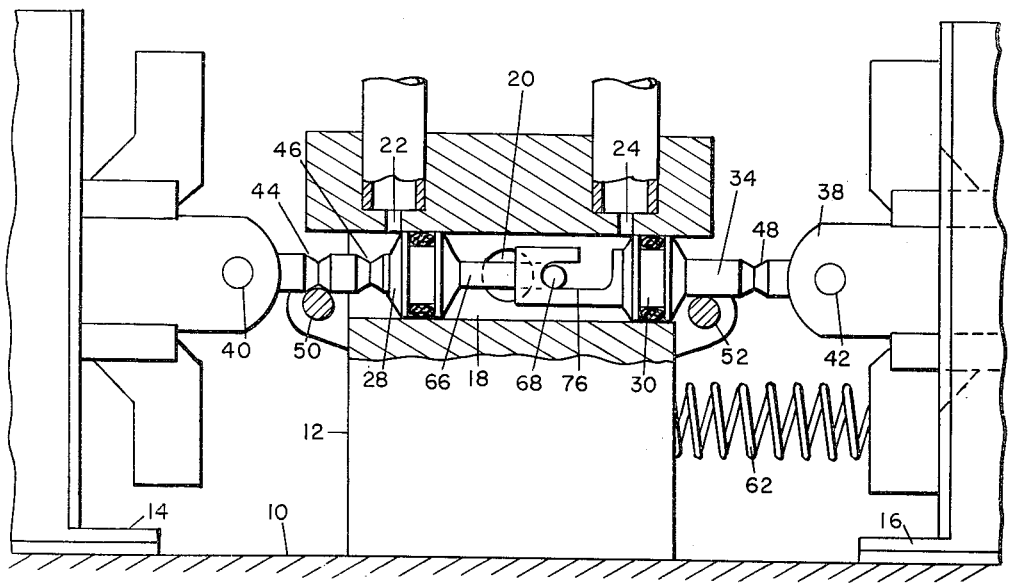

When the solenoid 14 is energized with the valve elements in the position of FIG. 2 the valve head 28 will be moved to the left, disconnecting the control port 22 from its discharge port and connecting it to the supply port 20 as shown in FIG. 3. The lateral member 68 of the T slides to the left and engages the end of the slot in member 70. In this position the detent 50 engages the recess 46 and secures the movable valve member in this position where it will remain upon deenergization of the solenoid 14. Fluid is supplied from supply port 20 through port 22 while port 24 is still connected to discharge port.

If solenoid 16 is energized with the mechanism in the position shown in FIG. 3 both valve heads 28 and 30 move to the right because the linkage between the valve heads is engaged positively so that the lateral strut of the T is carried to the right by the slotted head 70. This operation simultaneously disconnects port 22 from the supply port 20, connecting it to discharge, and connects port 24 to the supply port. The detent pin 50 engages recess 44 and secures valve head 28 in its first dwell position and upon the deenergization of solenoid 16 the spring 62 returns the valve head 30 to the left so that pin 52 reengages recess 48, disconnecting port 24 from the supply port and reconnecting it to discharge.

In the operation of the electrical data translation equipment that may be associated with this valve, the control valve is initially in the position shown in FIG. 2. The solenoid 14 is then energized and fluid pressure is applied through port 22. This condition of fluid pressure is maintained after de-energization of the solenoid 14 until solenoid 16 is energized, which action releases the pressure supplied through port 22 and connects port 24 to the fluid supply so that pressure is then supplied through that port. Upon de-energization of solenoid 16 the valve returns to the position of FIG. 2 and both control ports 22, 24 are connected to the discharge.

It will be evident that in the foregoing example, valve head 28 has two positions of dwell, in both of which the electric power to the solenoids may be turned off, since it requires only a momentary impulse on each solenoid to move the head between its two positions. Thus, the fluid-actuated mechanism connected to control port 22 may be left in the on or off positions of fluid power for as long as desired without the presence of electric current in the solenoids, as is desirable for example in the illustrated use to prevent disturbance of the operation of the electronic equipment. The other valve head 30 has one such position of dwell in which the fluid power and electric power are off, this coinciding with the off position of valve head 28 in the example. Head 30 could only dwell in its right-hand, fluid-pressure-on-position with the solenoid current on, but since only a momentary application of fluid pressure is needed in this position of head 30, there is no need for dwell. Head 28 is moved in one direction simultaneously with head 30 and in the other direction independently of the latter head, as is desirable in the operating cycle of the fluid-actuated mechanism mentioned above.

Thus it will be seen that the invention provides a simple, compact and reliable three-position valve mechanism which provides the coordinated control of fluid flow relative to two control ports. While a preferred embodiment of the invention has been shown and described it will be understood that the invention is not limited thereto or to details thereof and departures may be made therefrom within the spirit and scope of the invention as defined in the following claims.

We claim:
1. A control valve comprising a valve casing which defines a cylinder open at either end, said casing including a pair of system control ports and a supply port disposed between said two system control ports, said ports being in communication with said cylinder, two valve members disposed within said cylinder, each of said members being adapted to control fluid flow between said supply port and an associated control port and each including a valve stem and a fixed valve head, connection means disposed between said valve heads comprising a T member fixed to one valve head slidably mounted within a slotted member fixed to the other valve head, said connection means being adapted to allow a fixed degree of relative movement between the two valve heads, independent actuating means associated with each valve stem, two detent receiving portions on the valve stem of one valve member, and detent means pivotably mounted on said valve casing and adapted to cooperate with said detent receiving portions such that said one valve member may be secured in either of two positions of dwell, said valve members being adapted to be moved independently of one another by their associated actuating means when said one valve member is in a first dwell position and to be moved as a unit by the actuating means when said one member is in its second dwell position to provide coordinated control of fluid flow between said supply port and said control ports.

2. The control valve as claimed in claim 1 wherein each of said actuating means includes an electrical solenoid, each of said solenoids being adapted to move its associated valve member from a position of dwell upon its energization but to remain deenergized except during the transitional periods of valve movement.

3. A three position control valve comprising a valve casing which defines a cylinder open at either end, said casing including a pair of system control ports and a supply port disposed between said two system control ports, said ports being in communication with said cylinder, two valve members disposed within said cylinder, each of said members being adapted to control fluid flow between said supply port and an associated control port and each including a valve stem and a fixed valve head, lost motion connection means disposed between said valve heads comprising a T member fixed to one valve head slidably mounted within a slotted member fixed to the other valve head, two detent receiving portions on the valve stem of one valve member and a single detent receiving portion on the valve stem of the other valve member, detent means pivotably mounted on said valve casing and adapted to cooperate with said detent receiving portions such that said one valve member may be secured in either of two positions of dwell and said other valve member may be secured in only one position of dwell, and biasing means tending to maintain said other valve member in its single position of dwell, independent actuating means associated with each valve stem and adapted to move the associated valve from a dwell position, said valve members being adapted to be moved independently of one another by their associated actuating means when said one valve member is in a first dwell position and to be moved as a unit by the actuating means associated with said other valve member when said one member is in its second dwell position to provide coordinated control of fluid flow between said supply port and said control ports.

References Cited in the file of this patent
UNITED STATES PATENTS

| 2,015,182 | Hladik | Sept. 24, 1935 |
| 2,394,487 | Rotter et al. | Feb. 5, 1946 |
| 2,861,592 | Collins | Nov. 25, 1958 |